United States Patent
Venkatesan et al.

(10) Patent No.: US 7,100,149 B1
(45) Date of Patent: Aug. 29, 2006

(54) APPARATUS AND GENERIC METHOD FOR INTERFACING WITH MANAGED OBJECTS IN A COMMUNICATION NETWORK

(75) Inventors: Rajasekar Venkatesan, Cupertino, CA (US); Chetan Jain, Milpitas, CA (US)

(73) Assignee: CIENA Corporation, Linthicum, MD (US)

( * ) Notice: Subject to any disclaimer, the term of this patent is extended or adjusted under 35 U.S.C. 154(b) by 438 days.

(21) Appl. No.: 10/133,284

(22) Filed: Apr. 26, 2002

(51) Int. Cl.
*G06F 9/44* (2006.01)
(52) U.S. Cl. .................. 717/121; 717/108; 719/316
(58) Field of Classification Search ........ 717/106–127; 709/223–229; 719/311–316
See application file for complete search history.

(56) References Cited

U.S. PATENT DOCUMENTS 6,363,421 B1 * 3/2002 Barker et al. ............... 709/223
6,487,590 B1 * 11/2002 Foley et al. ................ 709/223

OTHER PUBLICATIONS

Raman, "OSI Systems and Network Management", IEEE, pp. 46-53, Mar. 1998.*
Kwon et al., "An Efficient Naming Service for CORBA-based Network Management", IEEE, pp. 765-778, May 2001.*
Chadayammuri, "A Platform for Building Integrated Telecommunications Network Management Applications—HP's OpenView Distributed Management Software Platform—Includes Glossary—Product Information", Hewlett-Packard Journal, pp. 1-13, Oct. 1996.*
Pavon, "Building Telecommunications Management Applications with CORBA", IEEE Communications Surveys, pp. 1-16, 1999.*
Harmohit Singh Datta, "Design and Implementation of a Management System for the Management of Mobile Agent-based Intelligent Network Services", Thesis, Technical University, Berlin, pp. 1-146, 1999.*

* cited by examiner

*Primary Examiner*—Ted T. Vo
(74) *Attorney, Agent, or Firm*—Dougherty Clements; Christopher L. Bernard; Tyler S. Brown (57) ABSTRACT

A method of interfacing with managed objects in a communication network, including: receiving an application independent request for service using generically represented data; mapping the request to a registry to determine the particular service application that can process the requested service; and executing the service application that can process the requested service. A network element in a communications network, includes: a managed object manager configured to map an application independent request for service and to forward the request to a service application that can process the requested service; and a registry coupled to the managed object manager and configured to provide mapped results that indicate the service application that can process the requested service.

22 Claims, 4 Drawing Sheets

Generic Interface to a Network Element

Figure 4: Generic Interface to a Network Element

APPARATUS AND GENERIC METHOD FOR INTERFACING WITH MANAGED OBJECTS IN A COMMUNICATION NETWORK

TECHNICAL FIELD

This invention relates generally to communication networks, and more particularly to a generic interface for monitoring, configuring, and controlling the managed objects in order to manage a network element in a communication network.

BACKGROUND

Conventional network elements can support various services and features such as monitoring, configuring, and protecting circuits in a network. As the numbers of services and features are added to a network element, additional management servers and server-related components will have to be added for each new service or feature to permit interaction between the network element and client devices. Additionally, a new interface will have to be added for each new service so that clients can communicate with the newly introduced service. The addition of new interfaces typically has a detrimental impact on the network element components and/or modules and on the client devices that interact with the network element. Additional design, development, and verification efforts are needed to add such new services and these additional efforts can increase the time to market of these new services.

Figure 1:
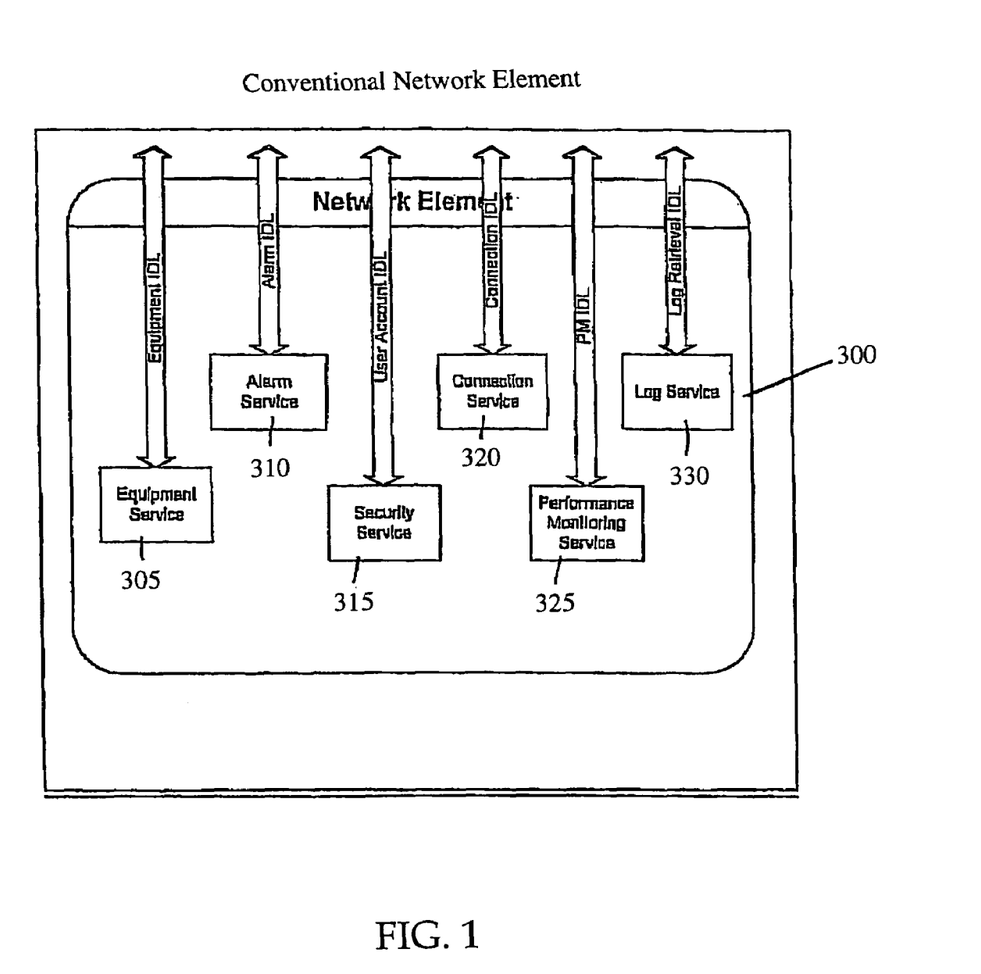
FIG. 1 is a block diagram that shows a conventional network element.

Reference is now made to a conventional network element 300 in FIG. 1 for purposes of describing the drawbacks and disadvantages of previous approaches. Some of the drawbacks and disadvantages of the conventional network elements are as follows. Each of the different service applications (or alternatively called services) (e.g., Equipment 305, Alarms 310, Security 315, Connections 320, Performance monitoring 325, and/or Log 330) require different interface definition languages (IDLs) (e.g., Equipment IDL, Alarm IDL, User Account IDL, Connection IDL, Performance Monitoring ("PM") IDL, and/or Log Retrieval IDL, respectively) as interface contracts between the conventional network element 300 and any client communicating to that network element 300. If additional service applications are added to the conventional network element 300, then the number of IDLs will increase, with one IDL added for each new service application. So for example, if a need arises to add protection capability to the network element 300, a new protection IDL would need to be added to the network element. To utilize this new IDL in the network element, all clients that need this capability also would have to implement this new IDL. Typically, the addition of a new IDL for each new service in the conventional network negatively affects all client devices that are coupled to the conventional network element 300. Additionally, components and/or modules on the conventional network element 300 are also typically negatively affected. For example, if the network element 300 supports fifty (50) services, then 50 IDLs may be required to be implemented. These IDL interfaces will require additional implementation (classes/programs). Thus, previous approaches have scalability problems when more functionality and complexity are added to the network elements 300.

Furthermore, these IDLs use explicit data structures and methods to express the functions of the new service being added. Hence, there is no relationship between the IDL defined for the connection service 320 and the IDL defined for protection service. This lack of a relationship, therefore, increases the development time, as each such new service results in an entirely new development effort.

This results in too much code that appears similar on both the network element 300 and the client side. However, since their IDLs have different services, functions and structures, they cannot be combined and handled in a uniform fashion.

Thus, a new method is needed to permit the addition of new services on network elements while minimizing the time to market. Another important factor that needs to be considered is the backward compatibility of the new services and enhancements to existing services. The interfaces need to be generic enough to make such enhancements easy.

SUMMARY

In one embodiment according to the invention, a method of interfacing with managed objects in a communication network, includes: receiving an application independent request for service using generically represented data; mapping the request to a registry to determine the particular service application that can process the requested service; and executing the service application that can process the requested service.

In another embodiment, a network element in a communications network, includes: a managed object manager configured to map an application independent request for service and to forward the request to a service application configured to execute the requested service; and a registry coupled to the managed object manager and configured to provide mapped results that indicate the service application that can process the requested service.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 2:
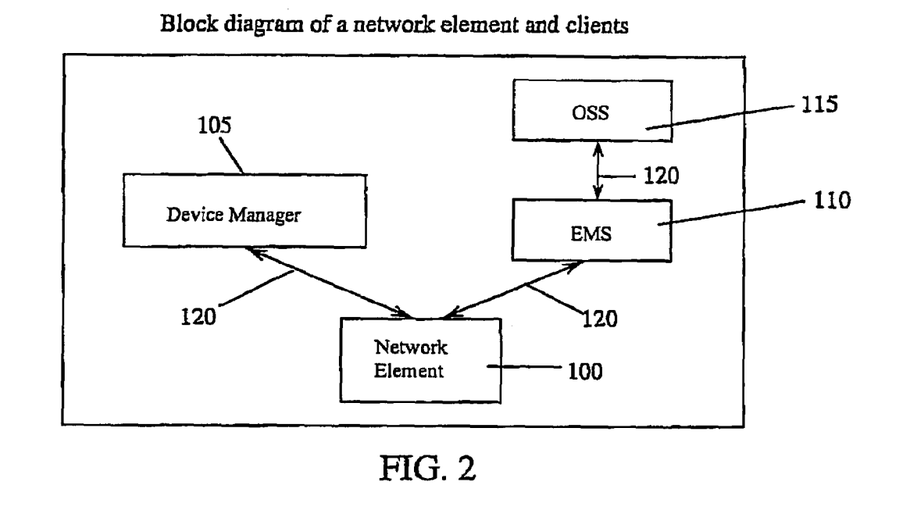
FIG. 2 is a schematic block diagram that shows a network element connected to multiple clients, in accordance with an embodiment of the invention.

FIG. 2 illustrates a generic block diagram of a network element 100 along with the clients (or alternatively called client applications) 105 through 115. In this example, the clients 105, 110, and 115 are shown as a device manager 105, an Element Management System (EMS) 110, and North-bound Operational Support Systems (OSS) 115, although a client may be other types of devices. The illustrated network topology is provided for example purposes only, and other suitable network topologies may be used within the scope of the invention. These elements in FIG. 2 communicate with one another, as needed, in an overall effort to provide visibility of the network to the network operators. The protocols used to communicate with each other (shown in FIG. 2 as bi-directional arrows 120) may be based on different protocols. Described below is an embodiment of a generic interface that can be used for such communications, irrespective of the protocols. An embodiment of the generic interface allows management clients to control, manage, and monitor the network elements in a uniform manner.

The network elements, described in FIG. 2 may be any suitable network element such as, for example, the CoreDirector™ switch, CoreDirector™ CI switch, MetroDirector K2™ multi-service access and switching platform available from CIENA Corporation or any other network element available from another vendor.

Figure 3:
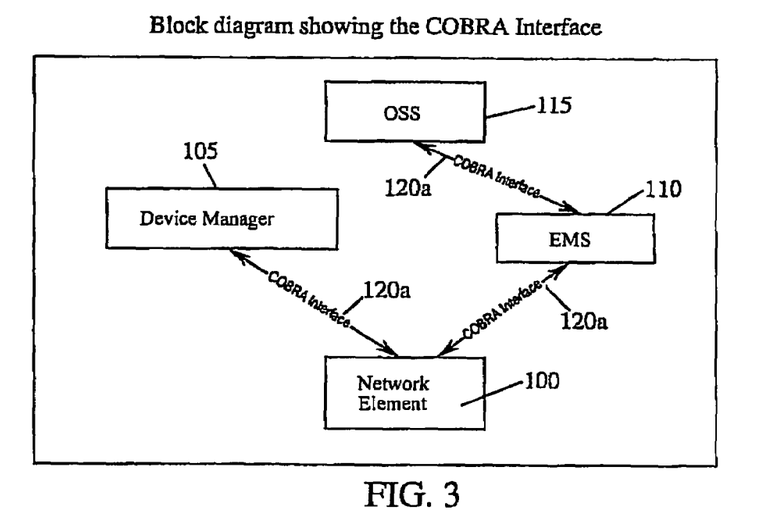
FIG. 3 is a block diagram that shows the CORBA interface of an embodiment of the present invention.

These interfaces 120 could be implemented in several ways. For example, the interfaces 120 could be implemented using Common Object Request Broker Architecture (CORBA), Transmission Control Protocol/Internet Protocol (TCP/IP), Hyper Text Transfer Protocol (HTTP), or any other client-server approach. In an embodiment as described below and as shown in FIG. 3, CORBA is used as a mechanism or example to describe a functionality of the generic interface 120. This is shown in FIG. 3 as CORBA Interface 120a. However, this mechanism for the generic interface 120 is not restricted to CORBA.

CORBA Management services are based on the Common Object Request Broker Architecture (CORBA). As known to those skilled in the art, CORBA is an architecture and specification for creating, distributing, and managing distributed program objects in a network. CORBA allows programs at different locations and developed by, for example, different vendors to communicate in a network.

An interface definition language (IDL) defines an interface "contract" between a client device and a network element. An IDL typically is independent from the programming language(s) used in a client device and in a network element. Details of a generic IDL is described below in accordance with an embodiment of the invention.

As discussed below, in one embodiment of the invention, a new method or design that allows the network elements to define a generic interface using the interface definition language (IDL) that can be used across all such services.

Figure 4:
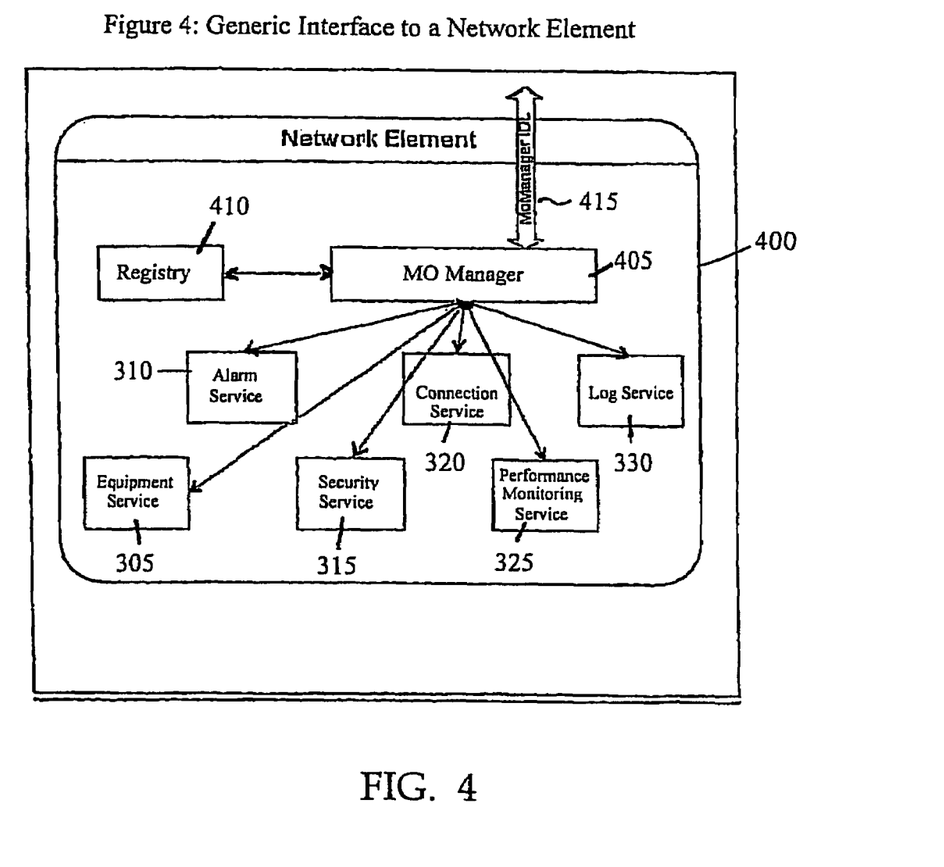
FIG. 4 is a block diagram that shows a network element and generic interface, in accordance with an embodiment of the invention.

FIG. 4 is a block diagram of an embodiment of a network element 400 that includes a generic interface 415 (called the "MoManager IDL" in this example) that is used by the clients to communicate with the network element 400. Managed Objects (MO) are objects on the network element 400 that can be uniquely identified, monitored and managed. A MoManager 405 is a logical class or sub-system that manages a collection of services, where each service holds a collection of managed objects (MOs) of a given type. The MoManager IDL 415 is the generic interface that can be used by the client to communicate to the network element 400 for any service offered by the network element 400. This service provides the basic operations such as, for example, create, delete, modify, get, getBatch and invokeOperation, as described in additional detail below with reference to FIG. 5. These operations are generic and take parameters (information) in a generic format so that the same IDL can be used across all services. Advantages that may be provided by an embodiment of the invention includes, for example, decrease in product development time, increased scalability and functionality for a network element with decreased problems associated with complexity, and/or savings in memory resource since different classes are not loaded in memory. In addition, an embodiment of the present invention may provide a consistent behavior for clients across all services.

In this approach, the network element 400 includes a Managed Object Manager (MO Manager) 405 that can receive an application independent request for service from a client device (e.g., Device Manager 105 in FIG. 3). The client device and network element 400 interact and communicate with each other based upon the generic IDL. The application independent request for service could be implemented using a protocol such as CORBA, TCP/IP, HTTP, or any other suitable client-server protocol. The application independent request for service also includes data, such as an attribute value list or extensible markup language (XML). The MO Manager 405 maps the request for service to a registry 410. Based on the mapped results from the registry 410, the MO Manager 405 forwards the client's request to an internal service which carries out the requested service. Thus, the MO Manager 405 and the registry 410 manage the generic interface. Additionally, this generic interface can permit new services (e.g., services such as protection services or diagnostic services) to be added without the previous requirement of adding an additional CORBA management server and additional IDL for each added service.

In an embodiment, this generic interface and framework also provides better protection in terms of backward compatibility. If the client application is of an older version and tries to generate an access/update request, the network element 400 can manage those requests without apparent risk of affecting services. To further elaborate on this point or aspect, consider the comparison between the old and the new manner of managing the IDL interface and the client requests.

In the conventional process, the IDL structure for a given managed object type ("MoType"), such as a "circuit" service, would have been described as shown in Table 1:

TABLE 1

Struct circuit
{String name;
String endpoint A;
String endpoint B;
String protection;
Int rate;
}

In contrast, in an embodiment of a method of the invention, a new version of the "circuit" service would have been modified and the structure changed as shown in Table 2 below. This change could be based upon a new requirement to support labels in the circuit object.

TABLE 2

```
Struct circuit {
    String name;
    String label;
    String endpoint A;
    String endpoint B;
    String protection;
    Int rate;
}
```

A label can be a user defined field to identify, for example, the circuit or path. The managed object type, however, could be other object types, and as a result, an embodiment of the method shown in Table 2 is not limited to the object type of "circuit" or "Struct circuit {String name;
}".

If there is an interface mismatch between the client and network element, modifying a circuit with a newer client may lead to serious problems such as unmanageability of the network element. In contrast, in a method of an embodiment of the invention, the "circuit" related data is presented and understood by a client, such as an element management application, and the network element 400 in a generic manner and the above situation is managed more gracefully. This aspect is discussed below with reference to the examples in Table 3 and Table 4.

The presentation of the same data as described in Table 1 can be represented in a generically represented manner, such as in the format illustrated in Table 3:

TABLE 3

| Attribute Name | Attribute Value | Attribute Type |
|---|---|---|
| Name | East_to_West | string |
| protection | Gold | string |
| Endpoint A | node_a | string |
| Endpoint B | node_z | string |
| Rate | 12 | int |

With regard to Table 2, the data also can be generically represented, such as is illustrated in Table 4:

TABLE 4

*schema for MoType "Circuit"

| Attribute Name | Attribute Value | Attribute Type |
|---|---|---|
| Name | East_to_West | string |
| Label | Chicago | string |
| Endpoint A | node_a | string |
| Endpoint B | node_z | string |
| protection | Gold | string |
| Rate | 12 | int |

This data, as described in Table 4, can be represented by, for example, an attribute value list or an extensible markup language (XML). When an older version of a client generates a request and if that "modify" request tries to modify "Label" (e.g., "Label" as shown in Table 4), an older version of the network element will not recognize "Label" as an attribute name, thereby rejecting that request to avoid having an unknown parameter unpredictably affect the network element.

Typically, data related to different services supported by the network element were vastly different. However, in a new approach, the same data can be represented in an open ended name-value pair format as shown in Table 5. This format represents data in a unified way to software components on a both the client and the network element (or server) using a generic interface in an embodiment of the invention. This enables applications to handle vastly different services such as "circuit" or "equipment" using the same generically represented data format. Table 4 and Table 5 provide an example of how the data can be generically represented for a circuit and optical port, respectively.

TABLE 5

| Attribute Name | Attribute Value | Attribute Type |
|---|---|---|
| name | A-1-1 | string |
| rate | 12 | int |
| model id | OM-5R-622 | string |
| administrative state | lock | boolean |
| protocol | 5DH | string |

In contrast, in one embodiment, the generic IDL has two main parts: the data definition and the operations supported by that version. And combination of both of the above-mentioned parts provides the network element 400 the capability of allowing best possible changes and management capabilities from a mismatched (either backward or forward version) client application—element management system 120 (FIG. 2). The above features can be achieved by the functionalities shown in FIG. 5 below and described in the corresponding text below.

Additionally, the framework empowers the network element 400 with limited forward compatibility. A client application which is not aware of the new services can still make a request and the MoManager 405 sensing that the above-new service(s) is still not supported can gracefully decline the request of the client, but can keep serving client application for all the other services that are available. The same is true for additional functionality that has been added/removed from the existing services. The above features can be achieved by the functionalities shown in FIG. 5 and described in the corresponding text below.

The generic interface (called the MO Manager IDL in FIG. 4) is explained in the following sections. Most managed objects provide basic mechanisms to create, modify, delete, get and operate on a managed object. Each managed object has a type associated with it. The "MO type" identifies the service that the managed object offers (for example, a connection MO, could be of a type cross-connect).

For purposes of understanding the functionality of an embodiment of the invention, the following section (as described below and shown in FIG. 5) uses the generic interface as defined between the network element 400 and the client. It is noted that this interface is generic and can be applied to communicate between other types of clients such as, for example, an Element Management System (EMS) and North-bound Operational Support Systems (OSS) as well.

Create

A create function 500 takes a set of MO names, the managed object type and a plurality of parameters (called ParamList) and creates the objects on the network element 500. The MoType field is used by the MoManager 405 on the network element 400 to look up in its registry 410 to find the sub-system that provides service for that type. In the example of FIG. 4, the sub-systems that provide services include, but are not limited to, blocks 305 through 330. The function 500 appears as Create (MoType, MoNames, Param- List). The ParamList typically contains all the mandatory attributes and other optional attributes and values that are used to create the managed objects.

This interface method will allow the clients to create new managed objects (MO), by specifying minimal information. Any attribute whose value is not set by the client can be assumed to have a default value. For any attribute not specified by the client, the network element 400 picks the pre-configured default. Any attribute that is not set by the client, but is mandatory and does not have a default value will cause the request to fail. The interface method will report this error with the appropriate reason. If the interface method requests creation of multiple objects, the network element 400 will typically perform the best effort to create as many objects as possible and provide proper feedback for all failures.

Delete

Figure 5:
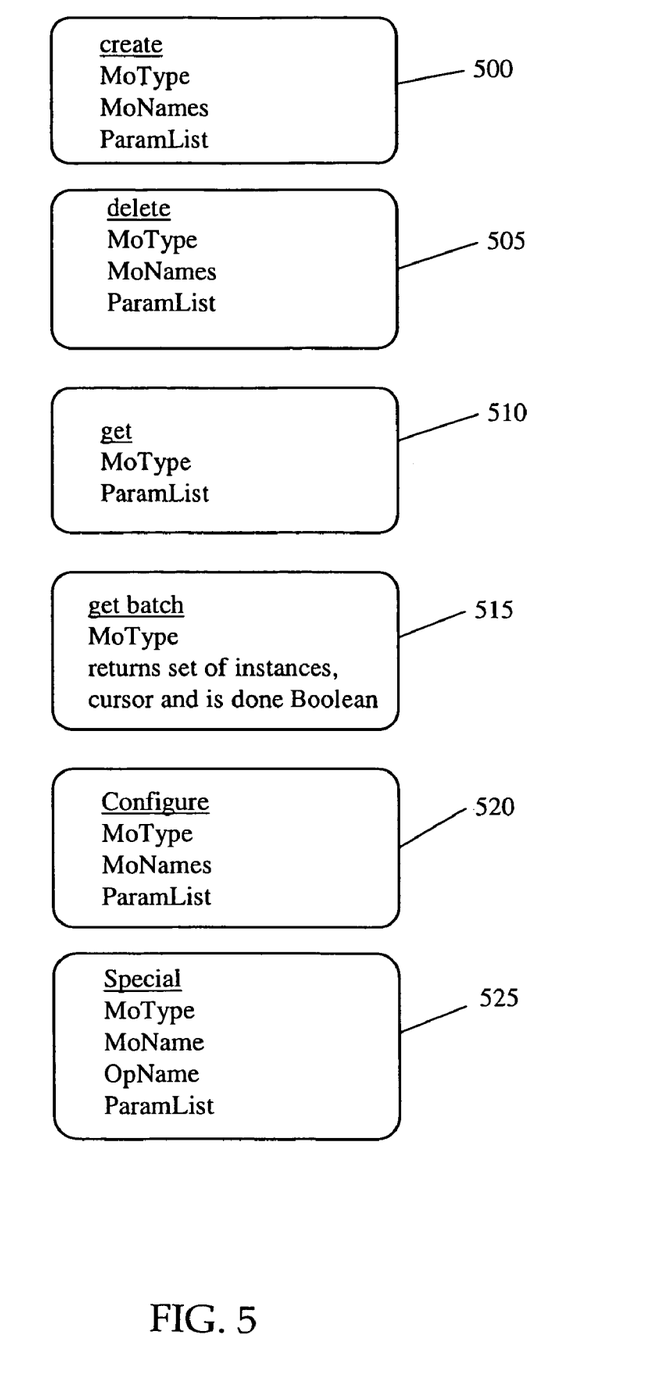
FIG. 5 is a functional block diagram that shows example operations that can be carried out by a generic interface, in accordance with an embodiment of the invention.

Similarly, a delete function 505 takes an MoType, a set of names and can delete objects from the network element 400 in a generic fashion. Again, the deletion method is a best effort approach.

Get

A get function 510 is used to locate and retrieve a single managed object. In order to perform this, the client has to pass the MoType, and the MoName of the object that the client is trying to retrieve. This operation appears as get (MoType, MoNames). If the object is not found, the network element will typically return an error notification or message.

Get Batch

Clients will typically have the ability to get all instances of a particular type of managed object. For example, the client may request information of all ports that exist on a network element 400. This interface provides a mechanism (get batch function 515) for clients to obtain such information. This method returns a set of instances of that MO Type, along with a cursor and a Boolean (called "isDone") indicating whether there is more data or not. The client can use this cursor and issue another GetBatch call 515, to obtain the next batch. This approach allows the network element 400, which is normally memory bound, to provide service to several clients, without running out of memory. The number of objects returned in each call 515 is determined by the network element 400. It is possible that the network element 400 may return zero objects, but still set the Boolean is Done to false. The clients typically will need to be able to handle such situations. Also the network element 400 should not maintain the state of the client internally. It typically encodes the state information in the cursor object and returns the information back to the client. There are two reasons for this approach: (1) the network element 400 need not reserve its precious resources waiting for a client to initiate the next batch (all those information are encoded and given to the client); and (2) by being stateless, the network element 400 can serve several clients simultaneously, where each client is iterating over the same data set, but at different rates.

Modify

The modify function 520 is used to change or configure any managed object. In order to perform this operation, the client's request would typically be of the form configure (MoType, MoName, ParamList). When several attributes of a managed object are modified, the network element 400 will typically apply the changes in the order in which the client has requested. In the event of failure occurrences during this process, the network element 400 will typically abort the changes for that managed object.

Special Operations

There are some managed object types that support special operations 520 (such as "administratively downing an object"). These operations are channeled through a special operation which is of the form invokeOperation(MoType, MoName, OpName, ParamList).

An embodiment of the invention provides a generic method to use a generic interface to invoke an operation on at least one or more object. For example, if a client will instruct a circuit to "exercise protection" (i.e., to use a protection path), where the circuit object is in a network element, then the above generic operation, invokeOperation( ), may be used, where MoType will be a circuit, MoName will be an instance of the circuit, OpName will be the operation name "exercise protection", and ParamList will be the required parameters for the operation. The same generic operation, invokeOperation( ), may be used so that the client can instruct a circuit for another operation such as "release protection" (i.e., where the protection path is not used).

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

The description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of interfacing with managed objects in a communication network, the method comprising:
   receiving, at a network element, an application-independent request for service, wherein the request includes generic operations and data in a generic format, wherein the generic data format is an open-ended name-value pair format, such that the generically represented data includes a subset of the name-value pairs supported by different service applications in the communications network so that the request may be used across the different services in the network;
   mapping the request to a registry to identify, from a plurality of service applications at the network element, a service application that can process the request;
   executing the identified service application based upon the request,
   wherein a plurality of client applications use the generic data format to transmit application-independent requests for service in the communication network,
   wherein the request is mapped to the registry by a managed object manager, and
   wherein the managed object manager and the registry together manage a generic interface.

2. The method of claim 1 wherein the request includes a protocol.

3. The method of claim 2, wherein the protocol includes Common Object Request Broker Architecture (CORBA).

4. The method of claim 1, wherein the mapping is performed by a managed object manager and wherein upon identifying the service application that can process the received request, the managed object manager forwards the received request to the identified service application for processing.

5. The method of claim 1, wherein the request is based upon a generic interface definition language (IDL).

6. The method of claim 1, wherein the request for service is transmitted from a client application.

7. The method of claim 6, wherein the client application transmitting the request includes an element management system.

8. The method of claim 1, wherein the network element includes a switch.

9. The method of claim 1, wherein the request permits the client application transmitting the request to control the network element.

10. The method of claim 1, wherein the request permits the client application transmitting the request to manage the network element.

11. The method of claim 1, wherein the request permits the client application transmitting the request to monitor the network element.

12. The method of claim 1, further comprising:
    adding a new application independent request for service to the registry to enable the mapping of the new request to one of the plurality of service applications.

13. The method of claim 1, wherein
    the mapping the request includes determining which of the plurality of service applications at the network element supports the subset of name-value pairs in the received request.

14. A method of interfacing with managed objects in a communication network, the method comprising:
    generating, at a client application, an application-independent request for service, wherein the request includes generic operations and data in a generic format, wherein the generic data format is an open-ended name-value pair format, such that the generically represented data includes a subset of the name-value pairs supported by different service applications in the communications network so that the request may be used across the different services in the network; and
    transmitting the request to a network element,
    wherein a plurality of client applications use the generic data format to transmit application-independent requests for service in the communication network;
    wherein the request is mapped to a registry by a managed object manager, and
    wherein the managed object manager and the registry together manage a generic interface.

15. The method of claim 14, wherein the request is based upon an interface definition language (IDL).

16. The method of claim 14, the method further comprising:
    determining, at the network element, which of the plurality of service applications at the network element supports the subset of name-value pairs in the received request in order to identify a service application that can process the request.

17. A network element in a communications network, comprising:
    a registry configured to provide a mapping between one of a plurality of service applications and an application-independent request for service, wherein the request includes generic operations and data in a generic data format wherein the generic data format is an open-ended name-value pair format, such that the generically represented data includes a subset of the name-value pairs supported by different service applications in the communications network so that the request may be used across the different services in the network; and
    a managed object manager, coupled to the registry, configured to receive the request and to forward the request to the one of the plurality of service applications for processing the request,
    wherein a plurality of client applications use the generic data format to transmit application-independent requests for service in the communications network,
    wherein the request is mapped to the registry by the managed object manager, and
    wherein the managed object manager and the registry together manage a generic interface.

18. The network element of claim 17, wherein the request includes Common Request Broker Architecture (CORBA).

19. The network element of claim 17, wherein the request is based upon a generic interface definition language (IDL).

20. The network element of claim 17, wherein
    the request is forwarded to the one of the plurality of service applications, which is determined by the managed object manager to support the subset of name-value pairs in the received request based on the mapping.

21. An apparatus for interfacing with managed objects in a communication network, the apparatus comprising:
- means for receiving, at a network element, an application-independent request for service, wherein the request includes generic operations and data in a generic data format, wherein the generic data format is an open-ended name-value pair format, such that the generically represented data includes a subset of the name-value pairs supported by different service applications in the communications network so that the request may be used across the different services in the network;
- means for mapping the request to a registry to determine from a plurality of service applications, a service application that can process the request; and
- means for executing the identified service application based upon the request,
- wherein a plurality of client applications use the generic data format to transmit application-independent requests for service in the communication network,
- wherein the request is mapped to the registry by a managed object manager, and
- wherein the managed object manager and the registry together manage a generic interface.

22. The apparatus of claim 21, wherein the means for mapping includes means for determining which of the plurality of service applications at the network element supports the subset of name-value pairs in the received request.

* * * * *